United States Patent

[11] 3,572,563

[72] Inventor Emerson T. Oliver
 Marblehead, Mass. (Essex Engineering & Mfg. Inc., Day St., Lynn, Mass.)
[21] Appl. No. 862,886
[22] Filed Oct. 1, 1969
[45] Patented Mar. 30, 1971

[54] TRUCK UNLOADER
 14 Claims, 7 Drawing Figs.
[52] U.S. Cl. .................................................. 214/516,
 104/172, 198/224
[51] Int. Cl. .................................................. B60p 1/38
[50] Field of Search ..................................... 214/516,
 38.8; 198/221, 222, 223, 224; 104/172 (B)

[56] References Cited
 UNITED STATES PATENTS
 2,819,810 1/1958 De Witt ........................ 214/516
 3,334,595 8/1967 Natof .......................... 104/172(B)

*Primary Examiner*—Albert J. Makay
*Attorney*—Kenway, Jenney & Hildreth

ABSTRACT: A loading and unloading apparatus for a freight-carrying vehicle having a low-friction bed to enable loads to be positioned along the length of the vehicle bed with ease. The device includes an unloading unit which is located forwardly of the load and is slidable along the length of the bed. When the vehicle is unloaded, the unloading unit is driven rearwardly to urge the loads toward the rear of the vehicle. The unloading unit is driven by an endless chain disposed beneath the vehicle bed for movement along a run that extends lengthwise of the bed. The chain and unloading unit are connected during normal loading operations and advance forwardly in unison to the forwardmost end of the bed. When the unloading unit has advanced to the forward end of the bed it automatically disengages the chain to permit continued forward advancement of the chain and loading of the vehicle. Loading is facilitated by a removable loading unit which is connected manually to the chain and which engages the rearward end of the load to advance the load forwardly in unison with the chain. Because the unloading unit disengages the chain at its forwardmost position, the chain may be driven continually in a forward, loading direction to continue to load the vehicle. Additionally, the loading unit may be manually disengaged from and repositioned along the chain.

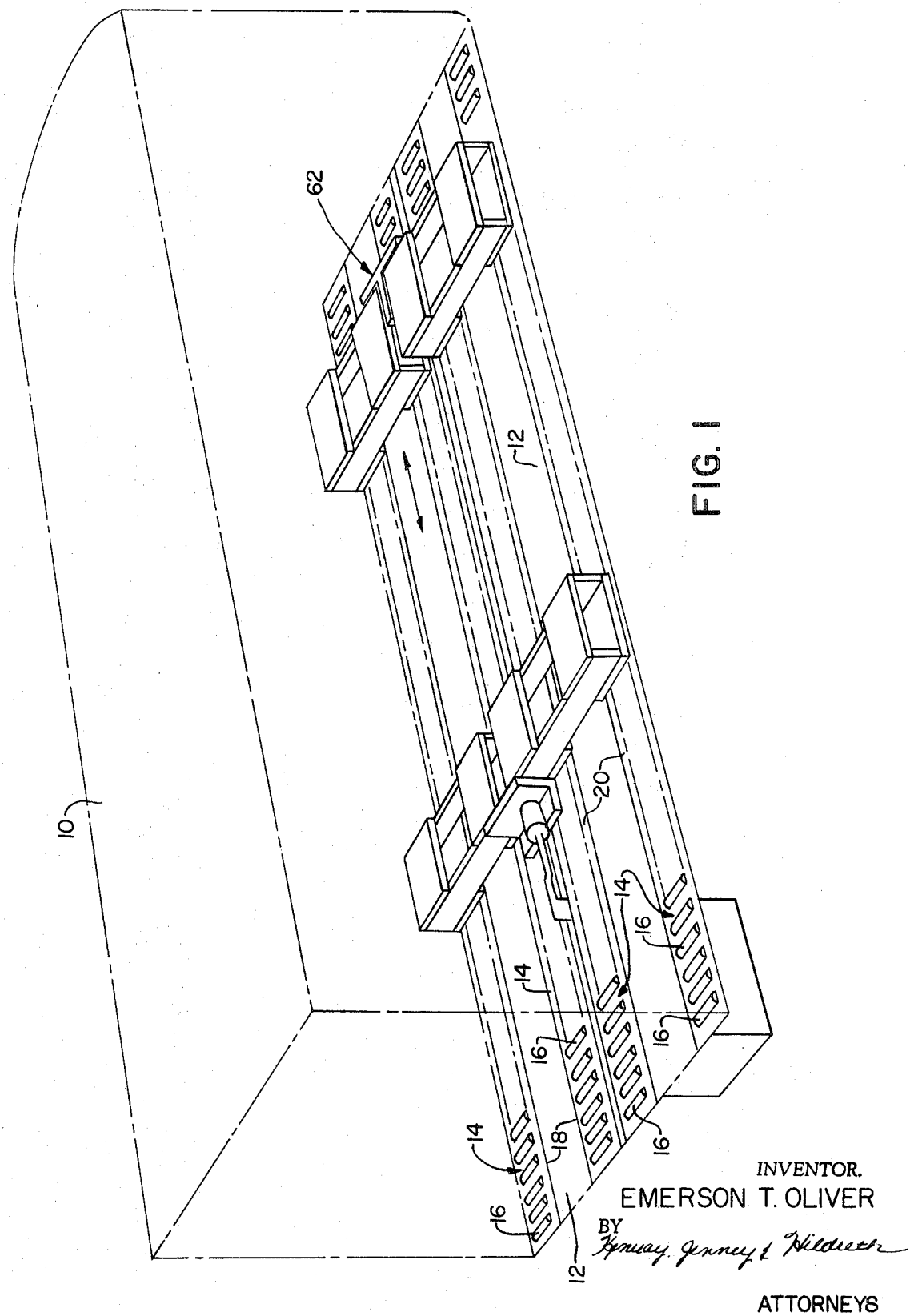

Patented March 30, 1971
3,572,563
4 Sheets-Sheet 2
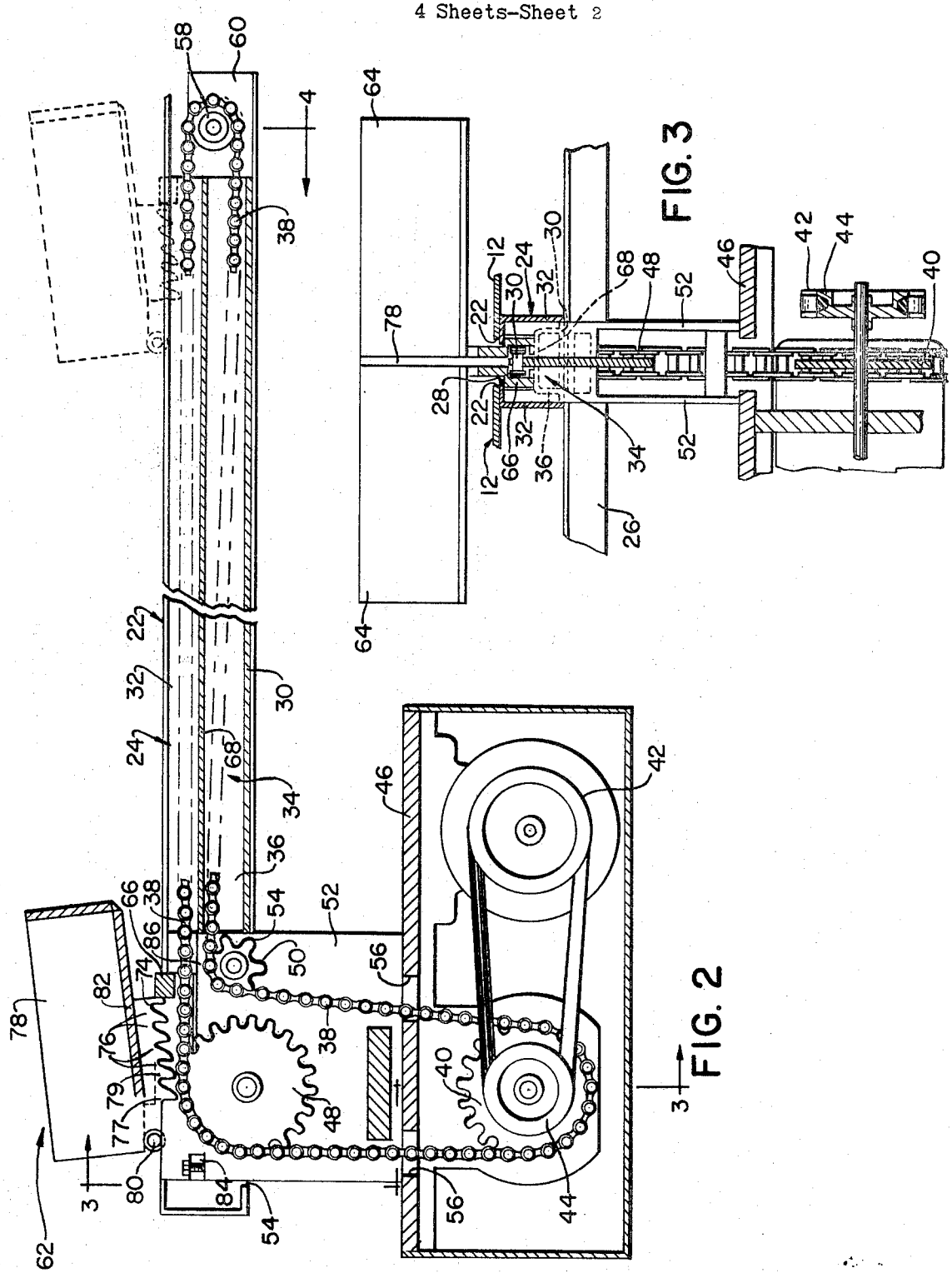
INVENTOR.
EMERSON T. OLIVER
BY
ATTORNEYS INVENTOR.
EMERSON T. OLIVER
BY
Kenway, Jenney & Hildreth
ATTORNEYS

TRUCK UNLOADER

SUMMARY OF THE INVENTION

My invention relates to material handling and, more particularly, to improvements in loading and unloading of materials from freight carrying vehicles such as trucks, planes, ships, and the like.

Improved material handling techniques have resulted in the utilization of low-friction conveyors in truck beds and other load carrying vehicles to simplify the loading and unloading of material or to reposition the load along the truck bed. This technique is advantageous particularly when handling heavy, bulky loads and enables the load to be handled more quickly and with greater safety. For example, one of the techniques frequently employed is to provide a number of rows of roller conveyors extending along the length of the truck bed. The rollers may be retractable to a position beneath the bed, as described in U.S. Pat. No. 3,243,029, so that after the load has been positioned along the length of the truck bed, the rollers may be retracted and the load will rest directly and firmly on the truck bed.

A number of techniques have been employed in handling loads with vehicles having low-friction beds. In order to overcome the obvious inefficiencies of manual loading and unloading, a number of mechanical aids have been proposed in the art. In general these devices include mechanical pushing elements which are driven forwardly and rearwardly along the length of the vehicle to perform a loading and unloading function. The pusher elements engage the containers or loads and urges them to the desired position along the vehicle bed. With these devices it has been necessary to employ auxiliary controls to terminate movement of a pushing unit after it has been advanced to a predetermined position along the vehicle bed. For example, microswitches may be employed to sense the presence of the pusher unit at one extreme end of its path of travel to terminate further advancement of the pusher unit and preclude jamming of the pusher unit or its drive mechanism. These prior devices, however, occasionally present some difficulty in that if the drive mechanism for the pusher unit is not stopped precisely when required the device may be damaged or may become jammed. It is necessary therefore that these devices operate with a relatively high degree of precision to ensure that the pushing function will terminate exactly when desired. Because of the generally rough conditions under which these devices must function it has been difficult to provide a device which operates with precision and yet which has a high degree of reliability. It is among the primary objects of my invention to provide a loading and unloading device for a vehicle of the type described which overcomes the foregoing difficulties and is of simple rugged construction yet which functions with the desired degree of precision and reliability.

In brief, my invention employs a continuous, endless chain supported beneath the vehicle bed. The chain is driven by sprockets arranged to drive the chain along an upper run at a level that is just below the bed. The upper run extends forwardly and rearwardly along the length of the vehicle bed and a slot is formed in the bed to expose the upper run of the chain. The sprockets are driven by a reversible motor to enable the upper run of the chain to be driven either forwardly in a loading direction or rearwardly in an unloading direction beneath the slot.

A loading unit and an unloading unit are disposed above the bed and are driven by the chain for loading and unloading the vehicle. The unloading unit is intended to be positioned forwardly of the load to engage the forwardmost end of the load. The unloading unit includes a number of downwardly extending teeth which protrude through the slot in the bed into driving engagement with the exposed, upper run of the chain. When the unloading unit is between either the extreme forward or rearward end of the upper run, it is driven forwardly or rearwardly in unison with the chain. As described below in further detail the unloading unit is disengaged automatically from the chain when it has been advanced to either extreme forward or rearward end of the upper chain run.

The separate loading unit also includes a number of teeth engageable with the upper run of the chain so that it too may be driven by the chain. The loading unit is intended to engage the rearward end of a load placed on the bed so that forward advancement of the chain will cause the loading unit to urge the load forward into the vehicle. After a particular load has been moved to a desired forward position, the loading unit then is removed manually from engagement with the chain to enable a subsequent load to be placed on the rear position of the bed. The loading unit then is reconnected to the chain rearwardly of the new load to urge the new load forwardly into the vehicle. This process is continued until the vehicle is loaded as desired. As the vehicle is loaded and the chain and the unloading unit advance forwardly along the bed, the unloading unit may reach the extreme forward end of the chain run. The automatic disengagement of the unloading unit permits the chain to be advanced thereafter in a loading direction to enable the loading process to be completed without it jamming or damaging the unloading unit or other elements of the device. Both the loading and unloading units include pusher plates which extend laterally over the conveyor means for engagement with the load.

When my device is employed, as described herein, with a low-friction conveyor, it will be appreciated that relatively bulky and heavy loads may be moved along the conveyor with minimal force. Thus the loading and unloading units need not be bulky and occupy relatively little space. Because of the relatively small, compact nature of the device, it does not interfere with close and efficient compacting of the load within the vehicle.

Also among the objects of my invention is to provide a loading and unloading device for a freight carrying vehicle which is of simple construction and which may be manufactured at a relatively low cost.

Another object of my invention is to provide a device for loading and unloading a vehicle which may be controlled, in its operation, from a location external of the cargo space of the vehicle and which does not require, the presence of the vehicle driver or other person within the cargo space to position the freight.

Another object of my invention is to provide a device for automatically loading and unloading a freight carrying vehicle which, by reason of its simplicity, may be added to existing vehicle as an accessory or which may be built into such vehicles at the time of their construction.

These and other objects and advantages of my invention will be apparent from the following detailed description of my invention with reference to the accompanying drawings in which:

FIG. 1 is an illustration of a truck in which the bed is provided with retractable roller conveyors and which employs the loading and unloading device in accordance with the invention;

FIG. 2 is a side elevation, partly in section, of the device illustrating the disengaged unloading unit;

FIG. 3 is an end view in section of the rearward end of the invention as seen along the line 3-3 of FIG. 2;

Figure 4:
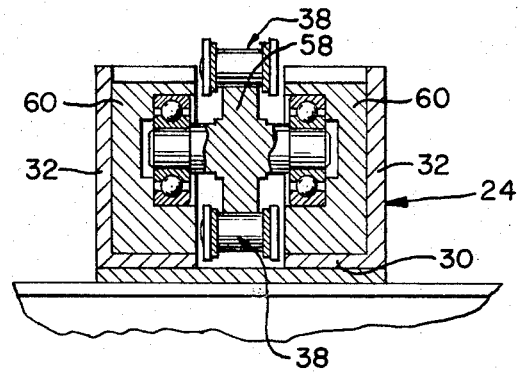
FIG. 4 is an end view of the forward end of my device as viewed from the line 4-4 of FIG. 2.

As shown in FIG. 1, a vehicle such as a truck body 10 having a bed 12 is provided with a number of conveyor rows 14, each conveyor row consisting of a number of rollers 16 mounted along the length of each conveyor row 14. The rollers 16 may be retractable as described above. The number of conveyor rows 14 and the lateral spacing between rows may be varied according to the dimensions of the vehicle bed 12 and the types of loads to be carried. The arrangement shown in FIG. 1, in which two pairs 18, 20 of conveyor rows 14 are provided, is suited particularly for use with palletized loads, so that each of the conveyor pairs 18, 20 may support a row of pallets on which the loads are carried. This arrangement enables two rows of palletized loads to be carried within the truck body 10. It should be understood that although my invention is described herein with reference to the arrangement shown in FIG. 1, it may be employed with any arrangement of conveyor rows 14.

Figure 7:
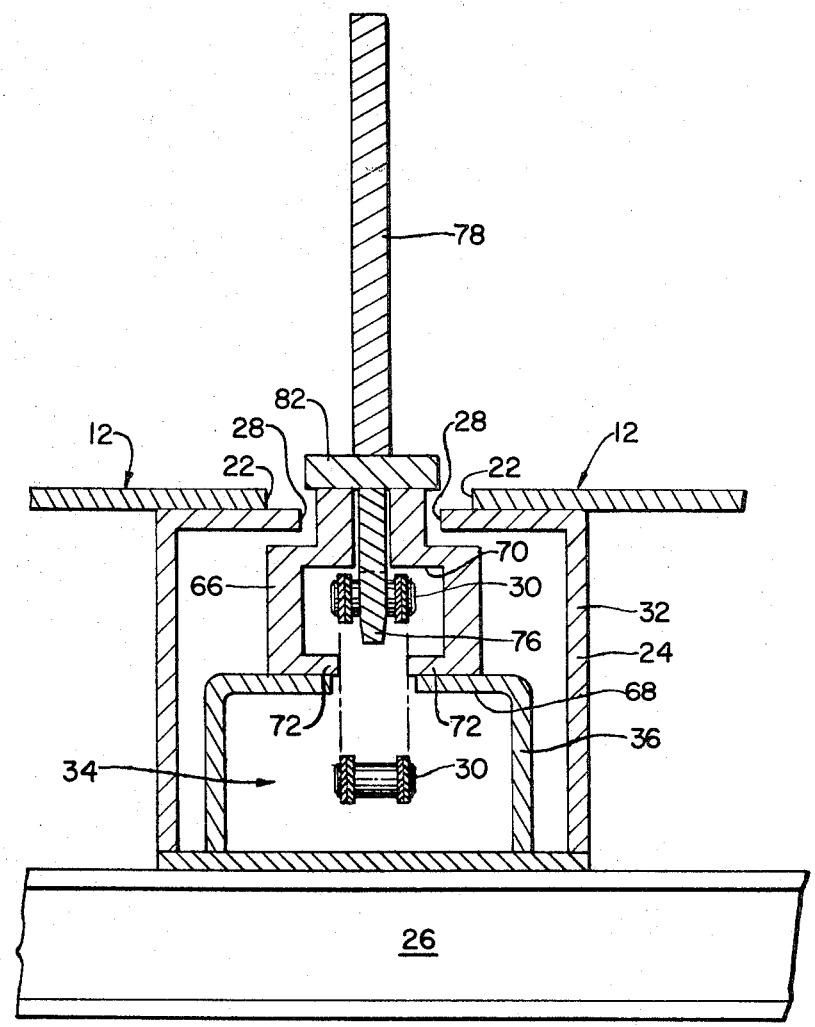
FIG. 7 is a sectional view of the pusher unit as seen along the line 7-7 of FIG. 5.

As shown more clearly in FIGS. 3 and 7, the bed 12 is provided with a slot 22 extending along the centerline of the truck in parallel to the conveyor rows 14. In the illustrative embodiment of the invention, the adjacent inner conveyor rows 14 of each conveyor pair 18, 20 are spaced in close proximity to each other and, in this case, the slot 22 may be formed directly between the conveyor rows 14 themselves. A channel-shaped incasement 24 is located beneath the bed 12 and may be supported on any of the rigid members of the vehicle, such as the crossmembers 26. The incasement 24, which has an upper slot 28 formed along its length, is disposed along the centerline of the vehicle body 10 so that the upper slot 28 is in registry with the slot 22 formed in the bed 12 between the inner conveyor rows 14. The incasement 24 includes a bottom wall 30 and sidewalls 32 which define a secondary guideway 34 between the incasement 24 and an inverted channel-shaped member 36 which is secured to the bottom wall 30 of the incasement 24. The secondary guideway 34 serves to channel or guide the lower return run of an endless drive member such as a chain 38. The portion of the interior of the incasement 24 which is above the channel 36 serves to guide the upper run of the chain 38 which is exposed through the registered slots 22, 28 formed in the incasement 24 and bed 12.

The drive for the endless chain 38 includes a drive sprocket 40, which is driven by a motor 42 through the clutch 44. The driving mechanism preferably is located at the rear of the truck and is supported from a mounting plate 46 which in turn is secured to a rigid member of the vehicle body 10 beneath the bed 12. The upper and lower runs of the chain 38 are guided to their respective levels above and below the channel member 36 by means of idler sprockets 48 and 50 which are rotatably supported between the sprocket supports 52. The sprocket supports 52 are secured to and extend upwardly from the mounting plate 46 and extend through a receptive opening 54 formed on the bottom wall 30 of the incasement 34. Suitable holes 56 are formed in the mounting plate 46 to enable the upper and lower runs of the chain 38 to pass therethrough and engage the drive sprocket 40. The forward end of the chain 38 passes about an idler roller 58 (see FIG. 4) which is supported rotatably between bearing blocks 60 located at the forward end of the incasement 24. The extremities of the upper run of the chain are defined, therefore, by the sprocket 48 and roller 58. Thus, the chain 38 is supported so that its upper run may be driven along a path conforming to that along which the load is to be moved. The motor 42 is reversible so that the exposed upper run of the chain 38 may be driven either in a forward loading direction or in a rearward unloading direction as desired.

An unloading unit 62 having laterally extending pusher elements or pusher plates 64 is associated with the chain 38, and may be driven along the length of the vehicle bed. The plates 64 of the pusher unit 62 extend over the adjacent conveyor rows 14 for engagement with the forward end of a load or pallet supported on the conveyor rows 14. The unloading unit 62 includes a retaining member or slide 66 disposed within the incasement 24 and which is slidably supported on the span 68 of the channel 36. As shown more clearly in FIGS. 5 and 7, the slide 66 includes a channel 70 formed along its length which receives, freely, a portion of the upper run of the chain 38. The lower portion of the slide 66, which bears on the span 68 of the channel 36, is provided with inwardly directed flanges 72 to ensure that the chain 38 is retained within the channel 70. The channel 70 is dimensioned to permit the slide 66 to pass freely over the chain 38. Additionally, the slide 66 is wider than the widthwise dimension of the upper slot 28 in the incasement 24 to preclude upward withdrawal of the slide 66 from the incasement 24 and separation of the chain 38 and slide 66.

The slide 66 also includes a rib 72 formed integrally along its length which extends upwardly through the registered slots 28, 22 to project above the level of the bed 12. A vertical slot 74, formed lengthwise along the rib 72, provides access to that portion of the upper run of the chain 38 which is disposed within the channel 70 of the slide 66. The slot 74 is respective to a number of downwardly projecting teeth 76 formed integrally with and at the bottom of a central plate 78. Thus, the teeth 76 may mesh with the chain 38 and be advanced in unison therewith.

Figure 5:
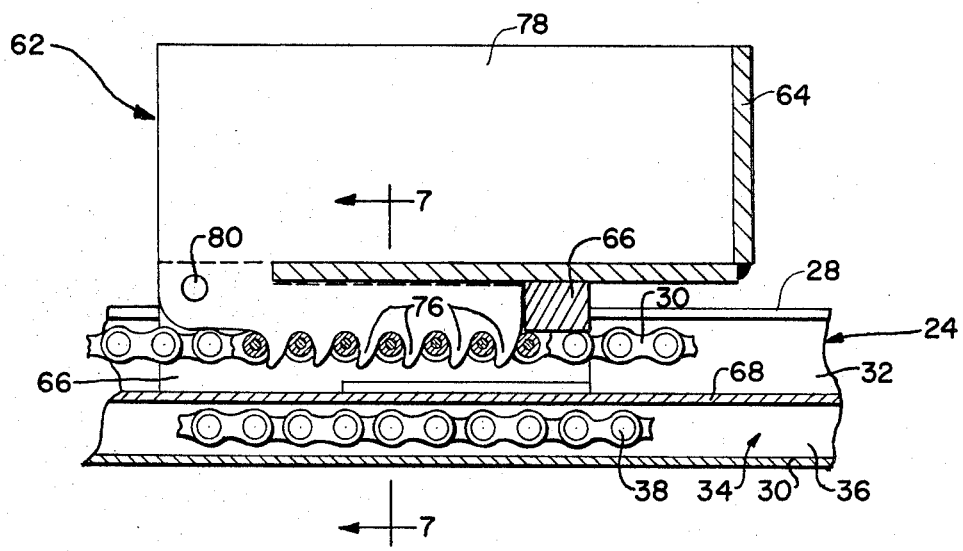
FIG. 5 is a side elevation, in section, illustrating the pusher unit in full engagement with the chain.

The rearward, lower corner of the central plate 78 is pivoted to the rearward end of the slides 66 at the pin 80 to enable the plate 78, pusher element 64 and teeth 76 to pivot upwardly (counterclockwise as seen in FIG. 2 and 5) out of engagement with the drive chain 38. It is important to note that the pivot pin 80 is disposed at a level which is above the level at which the teeth 76 engage the upper run of the chain 38. In accordance with the invention, the teeth 78 are disengaged from the chain when the unloading unit has been driven toward either its forward or rearward extremity of the upper chain run. For example, as the unloading unit 62 approaches the forward end of the chain run the forward end of the slide 66 will abut against the rearward end of the bearing blocks 60 to terminate forward movement of the slide 66 and, therefore, the entire unloading unit 62. Continued movement of the upper run of the chain in a forward loading direction acts on the teeth below the level of the pin 80 to impart a moment to the plate 78 (counterclockwise as seen in FIG. 2). This causes the plate 78, pusher element 64 and teeth 76 to pivot upwardly away from the chain and to withdraw the teeth from engagement with the chain. None of these parts will become jammed and the chain may be advanced fowardly in a loading direction until the vehicle is loaded fully. Although the chain is driven continually past the disengaged teeth 76 of the unloading unit, these parts will not become jammed or damaged. Instead, the teeth 76 will chatter as they rest on the moving chain.

When the vehicle is unloaded, the chain is driven in a reversed, unloading direction. As the upper run of the chain begins to move rearwardly the teeth 76 drop immediately into meshing engagement with the chain and the unloading unit is driven rearwardly with the chain to urge the loads rearwardly toward the exit In addition to the foregoing automatic engagement and disengagement of the unloading unit 62 it should be noted that, if desired, the unloading unit 62 may be repositioned along the length of the vehicle bed by simply raising the plate 78 or pushing elements 64 to withdraw the teeth 76 from engagement with the chain. The entire unloading unit 62 may be manually repositioned along the chain as desired and then released to enable the teeth 76 to drop downwardly into reengagement with the chain 38.

The downward pivotal movement of the central plate 78 and members supported thereon is limited by means of a lower plate 82 which is secured to the lower end of the central plate 78 above the teeth 76 which is adapted to abut the upper surface of the rubs 72 on the slide 66. The parts are dimensioned so that when the teeth 76 are engaged fully with the chain the weight of the central plate 78 will be borne by the ribs 72 and not by the chain 38.

FIG. 2 shows the unloading unit when in its most rearward position, such as at the tail gate of a truck. The extreme rearward position is limited by means of a rearward stop 84 which is secured to and spans the sprocket supports 52, the stop 84 being disposed at a level at which it may be engaged by the rearward end of the slide 66. The channel member 36 terminates at the forward end of the sprocket supports 52, so that when the unloading unit 62 and slides 66 are in the rearward-most position shown, the span 68 of the channel 36 no longer supports the slide 66. When in this position the slide 66 is supported by means of shoulders 86 formed at the upper, inner portions of the sprocket supports 52. As described above with respect to forward disengagement of the unloader unit 62 when the unloader unit 62 is in its rearward position, the teeth 76 will not jam with the sprocket 48 or chain 38, but will pivot upwardly out of engagement with the chain. When the unloading unit 62 is in its extreme rearward and disengaged position, continued advancement of the chain in a rearward unloading direction will not damage the device. The teeth 76 will chatter as they rest on the rotating rearward sprocket 48 and chain 38.

Figure 6:
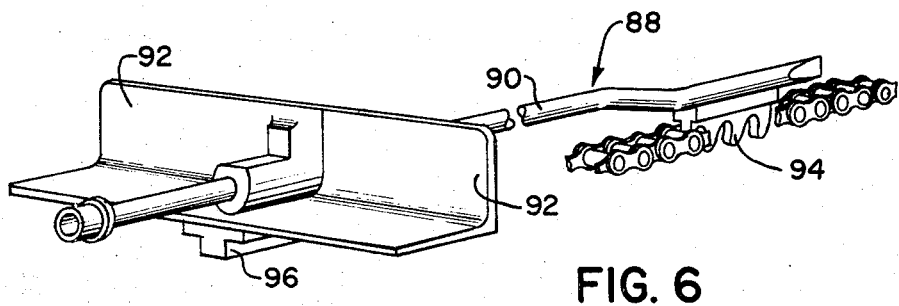
FIG. 6 is a view of the portable loading bar.

Loading of the vehicle may be facilitated by a loading unit such as the portable loading bar 88 shown in FIG. 6. The loading bar 88 may be formed simply from a length of pipe 90 or other elongate member to which a pair of transverse pusher plates 92 are secured. A number of downwardly extending teeth 94 are secured to or formed integrally with the leading end of the pipe 90 and are adapted to be inserted downwardly through the registered slots 22, 28 into engagement with the exposed upper run of the chain to drive the loading bar 88 therewith. The other trailing end of the loading bar 88 includes a downwardly protruding T-shaped stabilizing slide 96, which extends into the slot 22 and is guided along the slots 22, 28 as the chain 38 drives the loading bar 88 forwardly. The stabilizing slide 96 and teeth 94 maintain the bar 88 in alignment with the upper run of the chain. In loading the vehicle with the loading bar 88, the palletized load or crate is placed on the rearward end of the conveyor, as by a fork lift truck, and the loading bar 88 is placed rearwardly of the load, in the slot 22 with its teeth 94 in engagement with the chain 38. The upper run of the chain then is driven forwardly to urge the loading bar 88 forwardly so that its pusher elements 92 may engage the load and push it forwardly over the bed 12.

In summarizing the operation of the device the chain 38 is driven to position the unloading unit 62 near the rearward end of the vehicle but allowing space rearwardly of the unloading unit 62 for a palletized load or container to be placed on the bed so that its forward end is in engagement with the pusher elements 64 of the unloading unit 62. The loading unit 88 then is connected to the chain 38, rearwardly of the load as described above. The chain 38 then is driven in a forward loading direction to advance the load into the vehicle. The load preferably is advanced only to the extent necessary to provide room at the rearward end of the bed for placement of a subsequent load. Before the subsequent load is placed on the rearward end of the bed the loading unit 88 is removed. After the subsequent load is placed on the bed the loading bar 88 is again attached to the chain which is again driven in a loading direction to cause the loading unit to urge both loads forwardly in the vehicle. The operation continues until the unloading unit advances to the forward extremity of the chain run at which time it will be disengaged from the chain. If the vehicle is not then loaded fully, further loading is not precluded. The chain 38 may be advanced in a loading direction even though the unloading unit is in its most forward position.

When unloading the vehicle the chain is driven in a reversed, rearward direction which causes reengagement of the unloading unit with the chain 38. As the chain and unloading unit are driven rearwardly the loads are urged to the rear of the truck where they may be removed.

It should be appreciated that the foregoing description of my invention is but a preferred embodiment thereof and it may be modified to suit the requirements of any particular material handling arrangement. For example, the drive member, or chain 38 has been described as being recessed beneath the bed 12 of the vehicle. Although, in most instances, this will be desirable to protect the chain 38 and to preclude any tendency for the chain to become jammed against any portion of the load, there may be instances in which the chain may be mounted above the bed 12 and will be exposed. In this modification care should be taken to insure that the chain will be spaced at all times from the load being handled so that it does not interfere with the load.

It should be understood that the foregoing description of my invention is intended merely to be illustrative thereof, and that other modifications and embodiments will be apparent to those skilled in the art without departing from its spirit.

I claim:

1. A material handling device for use with a load carrying vehicle having a low-friction bed adapted to facilitate loading and unloading comprising:

a drive member supported in proximity to said bed, said drive member being movable along a reversible, predetermined path along said bed, said path terminating at forward and rearward extremities;

drive means operatively connected to said drive member to impart reversible movement thereto along said path;

an unloading unit engageable with said drive member for movement in unison therewith along said predetermined path, at least a portion of said unloading unit being disposed above said bed and being engageable with a load resting on said bed;

means responsive to positioning of said unloading unit at said forward extremity of said path for disengaging said unloading unit from said drive member thereby terminating said unitary movement of said drive member and said unloading unit whereby continue advancement of said drive member is ineffective to advance said unloading unit; and means responsive to reversed movement of said drive member to effect reengagement of said disengaged unloading unit with said drive member whereby said unloading unit may be driven rearwardly in unison with said drive member.

2. An apparatus as defined in claim 1 wherein said drive member comprises a chain and wherein said unloading unit includes tooth means engageable with said chain, said means for disengaging said unloading unit comprising: means responsive to positioning of said unloading unit at said forward extremity of said path to withdraw said tooth means for engagement with said chain.

3. An apparatus as defined in claim 2 wherein said drive member is supported by means comprising:

a forward idler rotatably mounted to the forward end of said bed;

a rearward idler rotatably mounted to said bed, said forward and rearward idlers comprising said forward and rearward extremities of said predetermined path and defining.

4. An apparatus as defined in claim 3 further comprising:

said unloading unit including tooth means extending downwardly therefrom toward and into engagement with said chain;

stop means mounted to said vehicle in proximity to said forward idler;

said unloading unit further including means abuttingly engageably with said stop means to limit the extent of forward movement of said unloading unit; and means responsive to engagement of said unloading unit with said stop means to effect ejection of said tooth means upwardly out of engagement with said chain.

5. An apparatus as defined in claim 1 further comprising: means mounting said unloading unit for sliding movement with respect to said bed and along said predetermined path.

6. An apparatus as defined in claim 5 wherein said means mounting said unloading unit for sliding movement along said predetermined path comprises:

a slide;

means guiding said slide along said predetermined path; and means mounting said unloading unit to said slide for movement in unison therewith along said predetermined path and in a direction transverse to said chain and said path to permit disengagement of said unloading unit from said chain.

7. An apparatus as defined in claim 6 wherein said drive member comprises a chain, said apparatus further comprising:

forward and rearward idler members mounted rotatably to said bed at the forward and rearward ends thereof to guide said chain and defining an upper chain run therebetween;

stop means supported by said bed adjacent said forward idler;

said unloading unit being movable in unison with said chain toward and into engagement with said stop member, said stop member defining the forward extremity of said upper chain run; and said means for disengaging said unloading unit from said chain comprising means responsive to engagement of said unloading unit with said stop member to effect said disengagement.

8. An apparatus as defined in claim 7 further comprising:

said unloading unit including tooth means extending downwardly therefrom toward and into engagement with said chain;

said means for disengaging said unloading unit comprising means responsive to engagement of said unloading unit with said stop member for urging said tooth means out of engagement with said chain.

9. An apparatus as defined in claim 8 wherein said tooth means is mounted to said slide about a pivot disposed rearwardly and above the level of the point of engagement of said tooth means with said chain, wherein engagement of said slide with said stop means imparts a moment to said tooth about said pivot to eject said tooth means outwardly from engagement with said chain.

10. An apparatus as defined in claim 9 further comprising:

means for guiding said run of said chain along said path, said guide means including a retaining member having a channel formed therein along its length to receive slidably and embracingly a portion of said run of said chain, said retaining member being mounted for slidable movement along said slide and beneath said bed in unison with said chain run, said retaining member having a portion thereof extending upwardly through said slot and said bed, said upper portion having a heightwise slot being dimensioned to enable said downwardly extending tooth means of said unloading unit to protrude therethrough into engagement with said run of said chain.

11. An apparatus as defined in claim 1 wherein said unloading unit further comprises:

a central rib;

said pivot means connecting the rearward end of said central rib to said slide to enable said central rib to be pivoted upwardly away and transversely from said chain;

said downwardly extending teeth being formed along the bottom edge of said central rib to enable said teeth to protrude downwardly through said heightwise slot in said slide and into said channel thereof to enable said teeth to engage that portion of the chain run which is embraced within said channel of said slide; and pusher elements secured to the other, free end of said central rib, said pusher elements extending transversely of said rib.

12. An apparatus as defined in claim 1 wherein said drive member is recessed below said bed, said apparatus further comprising:

said bed having a slot formed therein extending along said path; and said means connecting said unloading unit to said drive member extending downwardly through said slot into engagement with said drive member.

13. An apparatus as defined in claim 12 further comprising:

a loading unit completely separable from said drive means, said loading unit comprising;

an elongate member having a forward end and rearward end;

connector means secured to said leading end of said elongate member, said connector means extending downwardly therefrom and being insertable downwardly through said slot in said bed into engagement with said drive member to enable said loading unit to be advanced in unison with said drive member;

a stabilizing slide secured to the rearward end of said elongate member, said stabilizing slide having a portion thereof adapted to protrude downwardly through said slot in said bed to be retained and guided along said slot and predetermined path, said connector means and said stabilizing slide being effective to maintain said elongate member in alignment with said chain; and pusher elements secured to said elongate member and extending transversely thereof for engagement with a rearward end of a load.

14. An apparatus as defined in claim 1 further comprising:

means responsive to positioning of said unloading unit at said rearward extremity of said path for disengaging said unloading unit from said drive member thereby terminating said unitary movement of said drive member and said unloading unit whereby continued advancement of said drive member in a rearward direction is ineffective to advance said unloading unit; and means responsive to reversed movement of said drive member in a forward direction to effect reengagement of said disengaged unloading unit with said drive member at said rearward extremity of said path whereby said unloading unit may be driven forwardly in unison with said drive member.